_(12)_ United States Patent
Johnson

(10) Patent No.: US 8,423,604 B2
(45) Date of Patent: Apr. 16, 2013

(54) SECURE VIRTUAL TAPE MANAGEMENT SYSTEM WITH BALANCED STORAGE AND MULTI-MIRROR OPTIONS

(76) Inventor: R. Brent Johnson, Zurich (CH)

( * ) Notice: Subject to any disclaimer, the term of this patent is extended or adjusted under 35 U.S.C. 154(b) by 503 days.

(21) Appl. No.: 12/548,560

(22) Filed: Aug. 27, 2009

(65) Prior Publication Data

US 2010/0057844 A1 Mar. 4, 2010

Related U.S. Application Data

(60) Provisional application No. 61/093,057, filed on Aug. 29, 2008.

(51) Int. Cl.
*G06F 15/173* (2006.01)

(52) U.S. Cl.
USPC .......................................................... 709/203

(58) Field of Classification Search .................. 709/203; 714/6.23, 11, 4.11, 6.2, 6.3, 12, 13
See application file for complete search history.

(56) References Cited

U.S. PATENT DOCUMENTS

| | | | |
|---|---|---|---|
| 5,548,724 A | 8/1996 | Akizawa et al. | |
| 5,592,657 A | 1/1997 | Johnson et al. | |
| 5,970,149 A | 10/1999 | Johnson | |
| 6,041,329 A | 3/2000 | Kishi | |
| 6,275,855 B1 | 8/2001 | Johnson | |
| 6,499,108 B1 | 12/2002 | Johnson | |
| 6,578,146 B2 | 6/2003 | Johnson | |
| 6,748,430 B1 | 6/2004 | Johnson | |
| 7,080,260 B2 | 7/2006 | Johnson | |
| 7,120,675 B1 | 10/2006 | Shapak et al. | |
| 7,159,239 B2 | 1/2007 | Johnson | |
| 7,167,844 B1 | 1/2007 | Leong et al. | |
| 7,293,179 B2 | 11/2007 | Johnson | |
| 7,475,253 B2 | 1/2009 | Johnson | |
| 7,536,596 B2 | 5/2009 | Johnson | |
| 7,774,470 B1 * | 8/2010 | Sanders et al. ................ 709/226 |
| 7,779,416 B2 * | 8/2010 | Koga et al. .................... 718/105 |
| 7,877,511 B1 * | 1/2011 | Berger et al. ................. 709/242 |
| 7,987,265 B2 * | 7/2011 | Fukuzawa et al. ............ 709/225 |
| 2003/0065986 A1 | 4/2003 | Fraenkel et al. | |
| 2004/0006702 A1 | 1/2004 | Johnson | |
| 2004/0073831 A1 | 4/2004 | Yanai et al. | |
| 2004/0221038 A1 | 11/2004 | Clarke, Jr. et al. | |
| 2005/0267929 A1 | 12/2005 | Kitamura | |

(Continued)

OTHER PUBLICATIONS

Ashton et al., "Two Decades of Policy-Based Storage Management for the IBM Mainframe Computer", 2003, IBM Systems Journal, vol. 42, No. 2.

*Primary Examiner* — David Eng
(74) *Attorney, Agent, or Firm* — Head, Johnson & Kachigian, P.C.

(57) ABSTRACT

A system to facilitate distributed storage with balanced load and multi-mirroring options. The system includes a plurality of server processing central processing units, each server having one or more mount points for storage and retrieval of file data. At least one managerial system is in communication with each server, each managerial system having configure information for each server, mover module software, and checker module software. One or more pairs of remote data storage device servers are in communication with the servers so that each pair stores the same data as its counterpart so that they mirror one another, each server having software to dynamically spread workload across the available servers based on factors including the number of files already opened, the existence of files, and available space.

6 Claims, 3 Drawing Sheets

U.S. PATENT DOCUMENTS

| | | |
|---|---|---|
| 2007/0038887 A1 | 2/2007 | Witte et al. |
| 2007/0157294 A1 | 7/2007 | Johnson |
| 2007/0192375 A1 | 8/2007 | Nakatani et al. |
| 2008/0010324 A1 | 1/2008 | Stebner et al. |
| 2008/0281908 A1 | 11/2008 | McCanne et al. |
| 2010/0057790 A1 | 3/2010 | Johnson |
| 2010/0058465 A1 | 3/2010 | Johnson |

* cited by examiner

SECURE VIRTUAL TAPE MANAGEMENT SYSTEM WITH BALANCED STORAGE AND MULTI-MIRROR OPTIONS

CROSS-REFERENCE TO RELATED APPLICATIONS

This application claims priority to U.S. Provisional Application No. 61/093,057, filed Aug. 29, 2008, which is herein incorporated by reference.

BACKGROUND OF THE INVENTION

1. Field of the Invention

The present invention is directed to a secure virtual tape management system with balanced storage and multi-mirror options. In particular, the present invention utilizes multiple storage options for balanced storage based on a number of factors and utilizes multi-mirror options.

2. Prior Art

It is necessary to store and backup data for many mainframe computer installations primarily for the purpose of safekeeping critical information in the event of an unexpected loss of the primary copy. The backups are often remotely stored offsite of the mainframe installation.

The invention involves a distributed storage system including storage servers (hereafter server) able to service a client across a network by exposing typical disk, directory and file input/output operations in addition to control operations such as ascertaining the current workload of the server. The client is generally distributed in a modular form making its capabilities accessible to any general program by way of its inclusion.

Typical disk operations include the ability to enumerate the various storage locations, which might be referred to as disks or mount points, and ascertain their specific criteria such as its available free space. Typical directory operations include the ability to enumerate the files present on a particular mount point and ascertain their size and time of their last modification as well as being able to rename or delete them. Typical file operations include the ability to create, open, read, write, seek, truncate and close a file. Commonly expected file operation options are provided, such as the ability to open a file exclusively and/or open a file in a read-only manner. Further commonly available functions include being able to check for the existence of a file, determine the size of an opened file, determine the remaining space available to an opened file and determine the current file position of an opened file.

The control operations exposed by the server include the ability to collect the current use of the various mount points, the current use of the various network paths and the current list of clients and details regarding their activity. Mount point information includes total capacity along with past and current read and write rates along with the current number of open files being accessed. Network path information includes current send and receive rates. Client information includes identification information such as host name and user name, the name of the file currently opened as well as whether it is opened exclusively and/or in a read-only manner, the client's network address and corresponding server address to which it is connected, the total read from and written to the file, the time of the client's last file access and the rates at which the client is writing to the file, reading from the file, sending to the network or receiving from the network. This information affords a means not only to monitor use and detect problems but also to determine when additional mount points or servers should be introduced.

Administrative control (hereafter administrator) over the server includes being able to define the mount points it should use and specify whether any particular mount point should be an eligible target for new file creations. Marking a mount point as ineligible is particularly useful when it is to be removed from service where its enablement causes the system to effectively relocate data to other locations over time through attrition. An administrator may also perform mount point tests that perform a variety of input/output operations to verify their health and performance.

An administrator configures one or more managerial systems (hereafter manager) with the makeup of the servers, such as their network locations, and how they should be used as a whole, such as how they are expected to operate together. An administrator also configures the manager with the network locations of the clients, although it would be conceptually identical for this to be done in the reverse fashion where the clients are configured with the network locations of the managers. In either case, whichever has the network location of the other is responsible for establishing a connection in order to convey to the client the manager's configuration information. Multiple managers are designed to work together to exchange their information so that a failure of one does not stop the system as a whole from continuing normal function. The configuration includes one of two basic modes in which the servers are to be utilized by a client: standalone or mirrored. In either case a large, virtually singular pool of storage is created through the use of multiple servers.

Standalone mode means every server is treated as a independent member of the pool whereas mirrored mode means every two servers are paired and those mirrored pairs comprise the pool's membership. Mirrored mode logically pairs two similarly configured servers together as though they were a single entity meaning a write to this pair involves an identical copy of that data being received and stored on both servers. Mirroring involves designating that a pair of servers work independently but that clients cooperate towards producing equivalent data on both. The obvious cost of mirrored mode is that double the storage is required to store the same quantity of data that could be kept in standalone mode. The expectation for mirrored mode is that each server forming a pair is housed in a location apart from its counterpart for disaster recovery purposes. For example, one server might be located in close proximity to the client while the other might be placed across town. At the very least they should be supplied with independent sources of power.

Client connection to any server may occur across multiple network paths. For example, there might be more than a single network interface on both the client and the server capable of reaching one another. It would be expected each such network interface connects through independent means, such as individual routers, so that the loss of any single network component would not result in a complete loss of connectivity capability between the client and server. Connection is performed such that the path having the least activity is selected, an example of such measurement being available by way of the results from common ping command. In general, however, this can quite simply be effected by simultaneously making identically timed connection attempts across each of the available network interfaces and selecting whichever connection completes first. Regardless, the desired result is for the utilization of multiple network paths be as balanced as possible, albeit influenced by potentially varying network path speed maximums. Whenever a new connection is established the version levels of the server and client are exchanged allowing each to limit their conversation to those capabilities known to be available to the version of the partner to which they have connected. The server and client are coded to automatically suppress the use of features not recognized by their partner. An established connection is monitored by both the client and server and small 'heartbeat' packets issued after any idle period of one second. If either side detects an idle inbound period exceeding a configurable time period, such as 30 seconds, then the connection is terminated. In such a case the client will reattempt connection across all appropriate network interfaces. This provides the ability for a session to become switched from one network path to another in the event of any form of network path failure. The client maintains knowledge relating to the session state as it processes operation requests to the server and upon reconnection will restore that session state by reopening any necessary file, repositioning it appropriately and retrying whatever operation might have been in progress.

Just as balancing is performed for the use of network paths it is also performed by the servers when choosing which of its mount points to use to store a new file, spreading the load across them in as equal a manner as possible, influenced by the number of users accessing each specific mount point and their individual available space.

Notwithstanding the ability to define and use only a single server, a client employs the use of multiple servers when available and each is inspected and considered for use whenever a need exists to open or create a file. Whether or not mirroring is used, many servers may exist and balanced use is desirable based on factors such as number of active users, free disk space, network utilization and whether an instance of a specific file already exists. It is desired to balance, or spread, the load of multiple client systems across multiple servers. A file might, for example, be stored on a single server or it might be stored on multiple servers.

When a new file is to be created then all existing instances on all servers are first removed then the use and availability of all servers are considered to determine the most appropriate server(s) to use to store the file. Similarly, the first write to the start of an existing file that causes truncation results in that file being deleted from its current server(s) and recreated prior to completing the write so as to allow for a reconsideration of the best servers(s) for the file. Any time a newly created or modified file is closed a new unique identifier is produced which is stamped onto the file and stored in the manager, ensuring against the use of antiquated instances of a file which could arise through a server's outage.

When an existing file is to be opened then the entirety of servers are scanned to determine where the file is located. In the case where it is located on multiple servers, and when those servers are not bonded together to function as a mirrored server pair, pruning occurs to exclude secondary copies which are not as desirable based on such factors as the last write timestamp on the file, whether the file was properly closed and the file's unique identifier value, the latter of which is available from the manager.

When a mirrored server pair is selected for use, then the same file will be opened on each with instructions to write files being sent to each in order to result in the same file becoming produced on both. In contrast, however, reads need only be serviced by one of the two servers while the file pointer is simply kept in sync on the other. The particular server of the pair selected to service the reads, and thus incur a greater work load than the other, is selected by considering the usage of the two servers in order to balance the work loads. At the time a file is opened, the least busy of the two will be preferred to service read requests. In the event that a mirrored server fails, then all input/output will resort to the remaining server without interruption of the client.

For administrative purposes, it is possible for a client to specifically target a particular server and a mount point within it, overriding the balancing features of the system.

Due to the possibility of a server's outage, such as might happen if a network goes down or a server suffers a hardware failure, a checker component is periodically employed to scan all of the servers to ensure their health and consistency of data. For example, if an antiquated instance of a file is located it will be removed after the presence and integrity of a current instance of that same file is verified to exist. As another example, if a mirrored pair does not contain identical data then it will endeavor to reconcile any differences between them. The system, therefore, is self-healing and when such a copy is required then another component, the mover, is tasked with performing that operation.

Multiple of these otherwise independent distributed storage systems may be loosely coupled through the use of the mover component when simple network connectivity to both systems exists allowing it to perform copies between them. In this case the file criteria such as the last written date and unique identifier would be carried across so that it would remain identical. Such a copy could conceptually be automatically triggered upon detection by the manager of the completion of a file's creation or modification. The mover component would generally be employed for geographically distant installations and the network information relating to the address of the remote manager would be stored in the local manager for retrieval by the mover.

Also, the server strives to buffer information commonly requested by clients such as free storage space levels to reduce system load levels.

The present invention is supported via an encrypted communications protocol interfacing with, and relying upon, the teachings, practices and claims disclosed in U.S. Pat. No. 6,499,108 (hereinafter synonymously referred to as "Secure Agent®" or "SA"), which is incorporated herein by reference.

Secure Agent® Overview

The following overview is provided to facilitate a comprehensive understanding of the teachings of the instant invention. Secure Agent® utilizes a secure login sequence wherein a client connects to a Secure Agent® server using a key known to both systems and a client connects and presents the server with user identification (as used herein the term "client" refers synonymously to a remote user or component establishing, and communicating with the instant invention through Secure Agent® allocation and encryption processes as taught in the above noted applications). If recognized, the Secure Agent server initiates a protocol whereby the client's identification is verified and subsequent communication is conducted within a secured (encrypted) construct. For purposes of this overview, the term "server" should be considered a hardware configuration represented as a central processing unit wherein Secure Agent, a Host DLL and driver reside, and are executed. The term "DLL" as used herein refers to a Secure Agent host dynamically linked library (a.k.a. Host DLL). The term "DLL" or "dynamically linked library" is used in a manner consistent with that known to those skilled in the art. Specifically, the term "DLL" refers to a library of executable functions or data that can be used by a Windows™ or LINUX application. As such, the instant invention provides for one or more particular functions and program access to such functions by creating a static or dynamic link to the DLL of reference, with "static links" remaining constant during program execution and "dynamic links" created by the program as needed.

The Secure Agent® server presents a variable unit of data, such as the time of day, to the client as a challenge. The client must then encrypt that data and supply it back to the server. If the server is able to decrypt the data using the stored client's key so that the result matches the original unencrypted challenge data, the user is considered authenticated and the connection continue. The key is never passed between the two systems and is therefore never at risk of exposure.

The initial variable unit of data seeds the transmission of subsequent data so that the traffic for each client server session is unique. Further, each byte of data transmitted is influenced by the values of previously sent data. Therefore, the connection is secure across any communication passageway including public networks such as, but not limited to, the Internet. The distance between the client and server is not of consequence but is typically a remote connection. For accountability purposes, the actions of a client may be recorded (logged) to non-volatile storage at almost any detail level desired.

The access rights of each client (what the client is able to accomplish during a session) is governed by data stored on the Secure Agent® server to which the client is associated. As an example, such rights might encompass the ability to administer and utilize the services of the server system, which would, in turn, include capabilities such as adding new clients or components, changing a user's rights, transferring new code to the server, using a feature (or service) of the server and more.

Consequently, Secure Agent® allows for the transmission of new code to the server and for that code to be implemented upon demand by a client. Such dynamic, real-time implementation in turn, allows for the behavior of the server to be modified. It is to this behavior modification the instant invention addresses its teachings, and thereby advances the contemporary art.

As will be readily appreciated by those skilled in the art, though the instant invention utilizes encryption/decryption and code recognition technology associated with Secure Agent®, alternative technologies may be employed in support of the instant invention without departing from the disclosure, teachings and claims presented herein.

In one non-limiting embodiment, the invention's host information component provides tape catalog and tape mount information from the host processor by way of an emulator component device. The specific device may be any device type best suited for the facilities available to the host information component. Non-limiting examples include 3480, through special commands or sequences; 3286 printer emulation; or 3270 display emulation. Based on a unique communication sequence initiated by the host information component, this particular emulated device is able to recognize that it services the 'control path' and reacts accordingly.

The 'control path' between the host information component and the remainder of the invention is used to supply all information required from the host such as tapes to be scratched, tapes to be transmitted to vault, tape mount requests and tape retrieval (or recall) requests. The information relating to tape scratches, tape vaulting and tape retrieval is collected periodically by the host information component from the host processor's tape catalog. The information relating to tape mount requests is collected as they occur, either by intercepting an operator message or by otherwise hooking into a host processor's tape mount user exit, a method by which a utility may gain useful information. For a tape to be scratched, vaulted or recalled, the device correspondingly updates the virtual tape catalog. For a tape to be mounted, the device relays the mount request to the emulated tape drive indicated in the request, parsing the request as necessary per the host processor's tape mount request message format. If, for whatever reason, the tape mount cannot be satisfied, a message is sent up through the control path to the host information component in order that an operator message may be issued indicating the reason for being unable to service the request.

Additionally, status information maintained on behalf of the emulated tape device is updated to reflect the current status so that an administrator might be able to review it.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
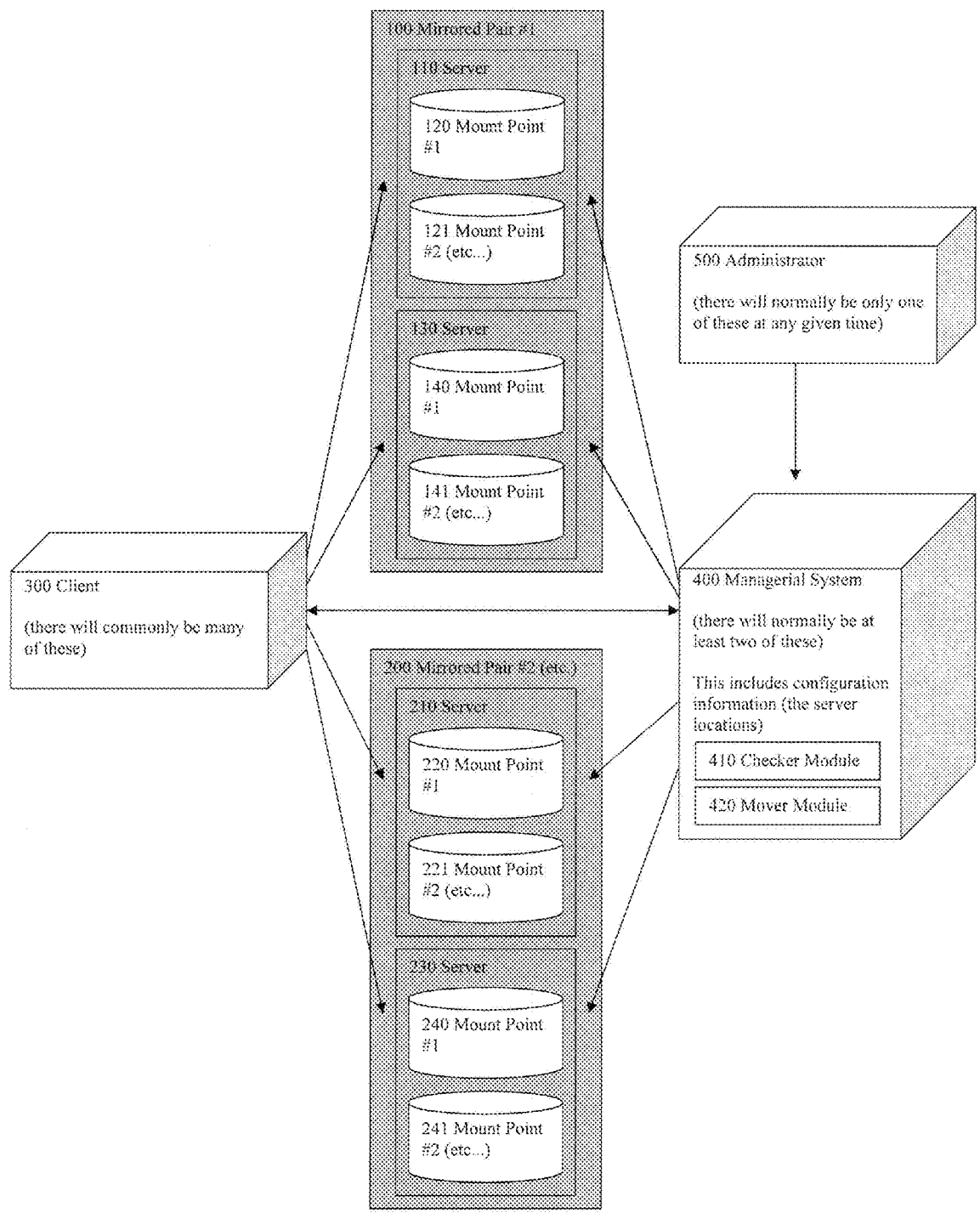
FIG. 1 depicts a schematic diagram overview of a system, illustrating two instances of mirrored pair servers in accordance with the present invention.
Figure 2:
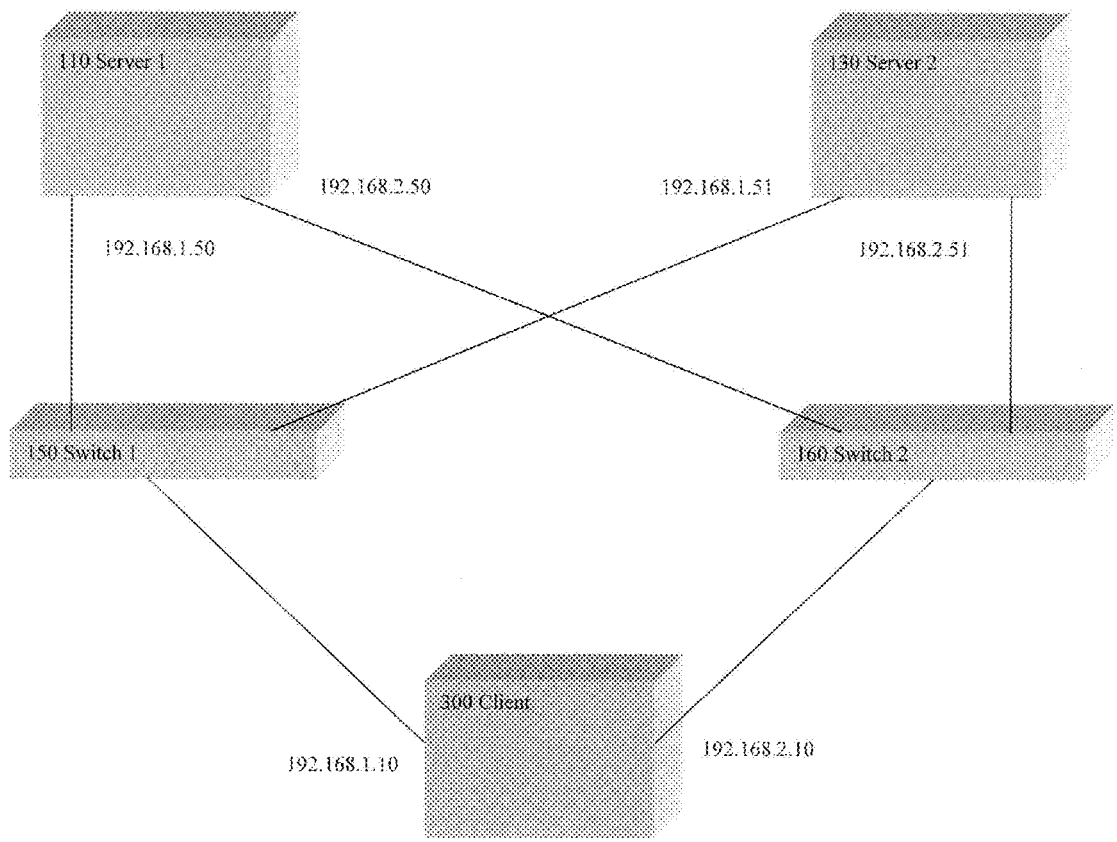
FIG. 2 is a schematic diagram depicting standard network connectivity between a client and a pair of servers to detail the connectivity between a client and to two servers forming a mirrored pair.

Referring to the drawings in detail, FIG. 1 illustrates a simplified schematic diagram providing a conceptual overview of the primary hardware and software components of the present invention in a preferred embodiment.

A Managerial System (400) contains the configuration information necessary for the system to function, stored to and retrieved from disk in a commonplace non-volatile manner. This information includes such items as:
1. The network addresses of every Server.
2. The mode the Servers are expected to use: standalone or mirrored.
3. The network addresses of every Client.
4. The unique identifier for every file.
5. The network addresses of any remote Managerial Systems (e.g. secondary remote instances of the system) to which data might be copied.
6. Matching criteria indicating which data, if any, should be copied to a particular remote instance of the system.
7. The network addresses of any peer Managerial Systems (e.g. secondary local instances of the Managerial System providing backup service) to which configuration information is propagated.
8. The network addresses of any Checker (410) modules, perhaps located on the managerial system itself.
9. The network addresses of any Mover (420) modules, perhaps located on the managerial system itself.
10. Rules relating to the automation of file copies between this Managerial System and a remote Managerial System.

An Administrator (500) connects to the Managerial System across the network using known high security encryption techniques in order to configure the aforementioned items.

A Server (110, 130, 210 and 230) is equipped with one or more Mount Points (120, 121, 140, 141, 220, 221, 240 and 241) to be used for the storage and retrieval of file data by a Client (300). The Server contains configuration information relating to the use of its Mount Points stored to and retrieved from disk in a commonplace non-volatile manner. This information includes such items as:

1. Each Mount Point to be used.
2. Which Mount Points are eligible for new file creation targets.

A Server also maintains in-memory statistical information including such items as:

1. The current available space on each Mount Point. When a particular Mount Point is not eligible for new file creations the free space is considered to be zero, thereby causing it to be bypassed for such purposes.
2. The total capacity of each Mount Point.
3. The number of files opened on each Mount Point.
4. Which Clients are currently accessing the Server by way of the Client's host name, user name, network address and to which of the Server's network addresses it is connected.
5. Which files are currently in use by Clients and how they are opened, such as whether read-only and whether opened exclusively.
6. Input and output totals for data read from and written to every opened Client file.
7. The time of the last access to every opened Client file.
8. Network usage rates (both input and output) for each Client, measured across a period of time.
9. Server-wide usage rates (both input and output) for each network interface, measured across a period of time.
10. Mount Point usage rates (both input and output) for each Client, measured across a period of time.
11. Server-wide usage rates (both input and output) for each Mount Point, measured across a period of time.
12. Some number of the most recent Mount Point test results, to be described.

A Server also maintains in-memory control information relating to each connected Client, such as:

1. The version level of the Client.
2. The handle for any opened file.

An Administrator is able to utilize facilities on the Server to perform Mount Point tests to measure storage input and output performance. A variety of tests are available to write to and/or read from a specific Mount Point or sequentially through the entire set of defined Mount Points in either a single pass or repetitive manner. In addition to maintaining an in-memory copy of the last ten or so test results for each Mount Point, every test result is added to a system log.

When a Managerial System is started it first attempts to connect to any and all peer Managerial Systems and logic is employed so that one is determined to be the primary while any others are determined to be secondary systems. Updates to the primary system's non-volatile configuration information are relayed to the secondary systems. In general, the longest running Managerial System is deemed the primary. As a primary updates any of its values it journals them with timestamps, providing the ability to reconcile deviations that are possible to occur when network disruptions afford an ability for a secondary Managerial System to become promoted to act as the primary even though the original primary continues operating. Managerial Systems continue to attempt to reconnect to every disconnected peer. During the negotiation process to determine which should become the single primary the update journals of each are compared and processed to ensure data consistency. Generally speaking, conflicting operations are dealt with by using a last one wins philosophy, meaning a later update timestamp is honored over any predating it.

When a Managerial System is first started, and on a periodic basis thereafter, it attempts to connect to every defined Client, Mover and Checker to which it is not currently connected. The connection is encrypted using known high security encryption techniques. After a connection is established, a primary Managerial System will provide the client the network addresses of every Server, such information being retransmitted whenever an Administrator updates it. If a primary Managerial System fails then the secondary that opts to promote itself to run as the primary will notify all Client systems of its new status.

When a Client attempts to establish a connection to a Server it issues simultaneous requests to each of the Server's network addresses, utilizing the first which completes at which time it closes all the others regardless of their current state. This logic presumes that the connection completing first represents the least loaded network path between the Client and the Server, desired to balance the load across the various network paths. The connection is encrypted using known high security encryption techniques. Although the invention is able to operate between Client and Server systems each having a single network interface it is desirable that both of those system have two or more interfaces providing not only greater bandwidth capacity but a backup in case one of the network paths fails where recovery may be employed.

While an active connection between a Client and a Server unexpectedly fails then a reconnection is attempted, performed in an identical manner as before where simultaneous connection requests are made to each of the Server's network addresses. Regardless of whether the failure represented a temporary problem and becomes immediately reusable, whichever connection completes first will again be selected. If a connection does not complete within a desired period of time the session becomes failed and the Client is notified. If reconnection completes, regardless of whether it is the same network path, the Client will reopen, reposition then retry whatever operation, if any, was being processed at the time of the failure. In order to accomplish this the Client maintains the following information for every opened file:

1. The Server's network addresses.
2. The version level of the Server.
3. The name of the file.
4. Whether the file was opened exclusively.
5. Whether the file was opened read-only.
6. The current position of the file pointer as stored before the completion of the current request, if any.
7. The current request, if any, and data necessary to accomplish that request. For example, a write request would require a buffer of data and the length of that data.
8. The time of the last network transmission.
9. The time of the last network reception.
10. The unique identifier for the file, when known.

A network connection will also be forcibly severed by either the Client or Server when no activity is detected. As a normal course of operation both the time of the last transmit and the last receive are recorded with a special heartbeat issued whenever a second passes without any transmits not associated with a normal request or response. Whenever a specific amount of time passes where neither normal session traffic or a heartbeat is received then the connection will be closed. When closed by a Server any opened file is closed and no further action is performed. When the Client closes the connection it is treated identical to an unexpected disconnection, as previously detailed, and reconnection performed.

When a Client connects to a Server they each exchange their version levels which indicate their capabilities. As new interoperable functions are created the version level is increased. Both the Client and Server systems are coded such that they understand the version level required for any particular interoperation, inhibiting anything that would not be understood by the connection partner. This provides the ability for any version Client to connect to any version Server without requiring both be simultaneously updated in response to newer code becoming available.

The Client accepts and manages service requests from a higher level application program in a modular fashion, such as is commonly exposed by way of a library with Application Program Interface (API) calls. As these service requests are completed the Client updates its copy of information as appropriate, such as modifying the current position of the file pointer after a read, write or seek operation. The operations exposed by the Client include such things as:

1. Enumeration of a Server's Mount Points and their free disk spaces, influenced by the Mount Point's eligibility for new file creations as previously described.
2. Enumeration of a Mount Point's files, their size and time of last modification.
3. Renaming a specific file.
4. Deleting a specific file.
5. Testing for the existence of a specific file.
6. Opening a specific file and common associated options such as whether to create it, whether it must already exist, whether it will be read-only and whether it will be used exclusively.
7. Reading from an opened file.
8. Writing to an opened file.
9. Seeking into an opened file.
10. Truncating an opened file.
11. Closing an opened file.
12. Determining the size of an opened file.
13. Determining the remaining space available for an opened file.
14. Determining the current file pointer position of an opened file.
15. Collecting a Server's in-memory statistical information, as previously detailed.

The Server's operational mode of standalone or mirrored influences how they are used. When standalone mode is in effect then every Server is a unique entity and when mirrored mode is in effect there are two Servers logically coupled to form a mirrored pair. When in mirrored mode the same data is stored on each of the two Servers forming the pair and is generally meant to provide protection against disaster by physically isolating them from one another. A pair of mirrored servers are always equipped with similar storage capabilities. A file stored on a mirrored pair means the same file is created on both of the two Servers and the data written is sent to both of the two Servers. Data read from a pair is, however, only actually required from one of the two Servers while the file pointer on the other is simply kept synchronized in case of a failure of the other Server, in which case it is able to take over the reading of data for the calling application. In the case of reading the Server having the lesser workload of the two is selected to actually perform the reads.

When a Client desires to open a file it first retrieves the file's corresponding unique identifier from the Managerial System, present when that file already exists. It then attempts to establish a connection to each and every Server to determine where files having a matching name and unique identifier are present. If no copy of such is located and if the open criteria demands an existing file then the open operation is failed. If matching files are located and if the open criteria demands creating new instances of the file then they are deleted before considering on which Server(s) to create a new instance of the file. If matching files are located and if the open criteria demands existing instances of the file then pruning might occur to narrow the selected Server(s) to a single logical entity, such a logical entry being either a single Server (standalone mode) or a pair of Servers (mirrored mode). When more than a single entity is located housing the same file, which normally should not exist, then factors such as which file was last written are considered to select the best choice.

When searching for the best location for a new file both the activity loads and available storage space of all available Servers are considered. For example, when the same number of Client connections exist on two Server candidates then whichever has the greater available storage space will be selected. After the selection of a Server an identical comparison is made between the Server's Mount Points to determine where to store the file.

In order to ensure optimal use of storage space, as well as the ability to migrate from Mount Points which have been marked as ineligible for new file creations, the first write at the beginning of a previously existing file, an operation that truncates all the file's contents, will cause the file to be closed, deleted and recreated. The previously outlined logic to determine the best location for the file is employed.

Although they are outside the normal use of a Client to Server relationship there exist maintenance facilities allowing specific access of files. One method allows a Client to access a file without having to successfully perform a unique identifier match. Another method allows a Client to access a file on a specific Mount Point, bypassing the Server's balancing logic, for either an existing file or a new file.

A Client which closes a file it created or modified will generate a new unique identifier, such as a random number but preferably more complex, providing it to the Managerial System to store. When such notification is made the Managerial System will compare information about the file change, such as the name of the file, to its set of automation rules and, upon a match, invoke the Mover to copy the file to the remote Managerial System indicated by the rule. The Mover will connect to the remote Managerial System in a secure manner as previously described to retrieve its network address of its Mover then connect to that remote Mover in a secure manner. The Mover will then open the newly modified file while the remote Mover will create the same file on its own set of Servers then the Mover will read and transmit the entirety of the file to the remote Mover to write. The same unique identifier and last written time are relayed across to be stored with the file causing them to be an identical copy in all respects.

On a periodic basis the Checker will scan the files of the various Servers to verify their unique identifiers match what is known in the Managerial System and otherwise appear complete. In the case of a mismatch, such as might occur where one Server of a mirrored pair were powered off, the Checker will consider whether a proper copy of the file is elsewhere available, going to the extent of considering remote Managerial Systems when available, connecting to them in a manner similar to that described for the Mover. If, however, a file appears to be a possibly complete, newer version than that known to the Managerial System then a report will be created for manual reconciliation. When a file needs to be restored, such as from one Server to the other of a mirrored pair, or from a remote location as determined through the use of a remote Managerial System, the Mover is invoked with the specifics of the copy operation to be performed whereupon it behaves in a similar manner as necessary to perform that operation.

Figure 3:
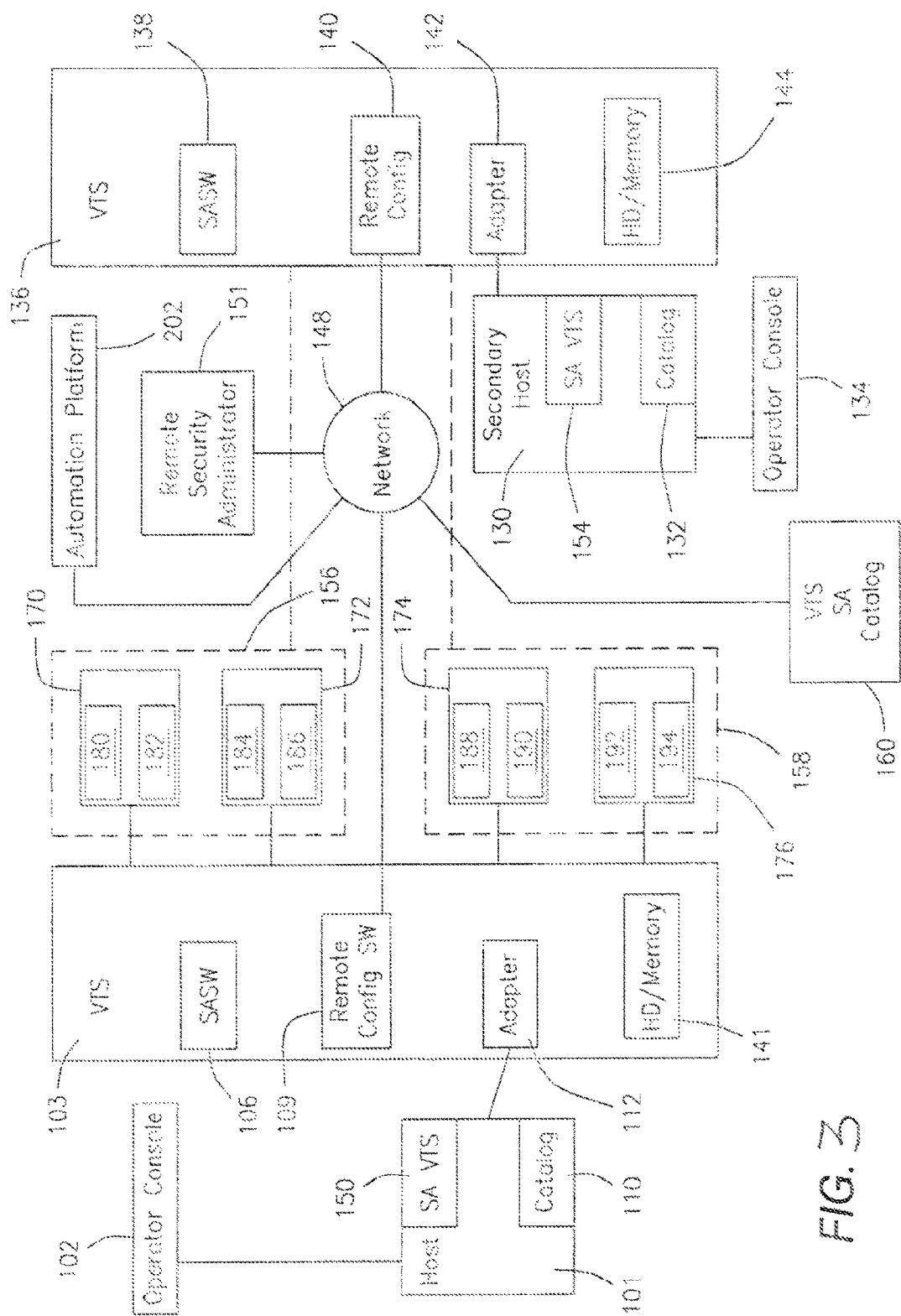
FIG. 3 is a schematic diagram of one non-limiting example of implementation of the present invention.

One non-limiting example of implementation of the present invention is seen in the schematic diagram in FIG. 3.

A mainframe host computer 101 may execute various operating systems such as MVS, VM, VSE, LINUX or UNIX. The mainframe host computer 101 may also include an inboard tape catalog 110. Additionally, the mainframe host 101 includes an operator console 102 communicably attached thereto.

Each mainframe computer host typically will be connected to at least one console, including a keyboard and display terminal, for operations personnel to monitor and control the operation of the system. The operations staff interface with the mainframe host computer 101 through the operator console 102. This console displays status messages about the computer system and allows the operations staff to control the operations of the mainframe host computer. For example, a job on the mainframe host may require data from a tape or from a virtual tape. The job will send a message to the console operator. The operator will then mount the requested tape and inform the mainframe host computer that it is available by making an entry at the console. Other types of messages include errors or critical situations occurring on the mainframe host computer. It is the console operator's job to monitor the mainframe host system through the console messages and note any problems that may occur.

The present invention includes a virtual tape system tape emulator ("VTS") 103 which has Secure Agent® software 106 executing under its control program. The VTS server 103 also has operating under control of its control program remote configuration software 109. Also embodied within the VTS server 103 is a hardware adaptor card 112. The adaptor card 112 is, in turn, communicably attached to one or more mainframe host processors, such as mainframe host processor 101. As used herein, the term "adaptor" refers synonymously to those hardware configurations such as, but not limited to, "adaptor cards" which allow for connectability between two or more central processing units and the transference of data associated therewith. Illustrative non-limiting examples of such adaptors as used herein would include various ESCON adaptors, parallel channel adaptors, FICON adaptors and SCSI adaptors.

The VTS server 103 also includes a hard drive or multiple hard drives with a memory or multiple memories 141.

The virtual tape system emulator component 103 conceptually consists of lower level and higher level layers. The lower layer may be a device driver communicating directly with one or more hardware adaptors attached to one or more computer systems, such as, but not limited to, mainframe computers (a.k.a. host processors). Illustrative non-limiting examples of such adaptors as used herein would include various ESCON adaptors, parallel channel adaptors, FICON adaptors, and SCSI adaptors. From the host processor's perspective, the tape drive emulator's virtual drives are indistinguishable from real tape drives as it pertains to normal operations.

The driver controls the hardware in a manner prescribed by its design, causing it to interact with the other host processor computer systems to which it is connected as if it were one or more device types (emulation). The driver acts as a conduit to the higher layer that governs the overall behavior of the emulated devices.

The higher layer primarily supplies the driver with new data to provide through the emulated devices to the other computers to which it is connected and accepts data arriving to the emulated devices carried up by the driver. The higher layer manages the information repository against which the driver operates. Using the example of a 3480 tape drive, the higher layer's information repository represents a virtual tape. Mainframe reads and writes are serviced using the contents of this virtual tape. The virtual tape files reside on RAID disk drives, encrypted using a central key phrase specified by a security administrator, as will be explained in detail. Therefore, the data stored onto the RAID devices is not useful when accessed outside of the present process, thereby increasing data security.

Each instance of an emulated device is associated with unique security group information which, when compared against the security group contained within the virtual tape catalog for each tape, controls which tapes may be loaded on it. This security group comparison is performed upon receiving a tape mount request from the host information component. Additionally, if the tape requested is for a 'scratch', then such a tape is requested from the virtual tape catalog.

If a tape is not locally available, because it has been moved off of the tape emulator component by either the remote data storage or archiver components, then the mount may not be immediately satisfied. In this event, a notification is made to the host information component. If the virtual tape catalog indicates that it should be automatically recalled then it will be updated to indicate such a recall should be performed; a priority event for the remote data storage component. In such an event the emulated device periodically inspects the virtual tape catalog to determine whether the tape has been recalled, continuing once it has.

Once an appropriate tape is locally available, exclusive access is ensured by comparing then setting its in use indicator within the virtual tape catalog. The virtual tape is then used as the emulated device's data repository. Upon being written, the virtual tape catalog is updated with the fact that it has been updated. As the contents of a virtual tape are updated by the host processor, relevant information is updated in the virtual tape catalog.

By default, a virtual tape that has been freshly written or created will receive the security groups of the device that created it. However, the administrative tool may be used to indicate certain dataset name characteristics that may be used to redirect the virtual tape into different security groups. Additionally, any other administration policies, such as might be applied based on the dataset names or expiration date, are applied.

When the tape is dismounted, the last access date is updated in the catalog. It is then marked as no longer being in use within the virtual tape catalog, allowing the remote data storage and archiver components the ability to act upon it as necessary.

A remote data storage component is primarily responsible for collecting a virtual tape image from the virtual tape emulator. The remote data storage component, when idle, periodically requests tape movement criteria from the virtual tape catalog, prioritizing 'recall' requests for virtual tapes to be recovered from the remote data storage to the tape emulator.

Like each emulated tape device and each virtual tape, the remote data storage component is assigned to one or more security groups controlling which tapes it is able to transfer from the tape emulator. If a candidate tape doesn't have a matching security group then it is not considered for transfer and ignored.

Prior to a transfer it ensures dedicated access by comparing then setting the virtual tape's in use indicator within the virtual tape catalog. The virtual tape is then copied as per the virtual tape catalog. After the tape has been copied the virtual tape catalog is updated to reflect the virtual tape's locations and time it was copied. Additionally, if the operation was not a recall and was a move rather than a copy, it is then deleted off of the tape emulator. Finally, the virtual tape's in use indicator is cleared in the virtual tape catalog.

Also shown on FIG. 1 is a secondary host mainframe 130 which includes an inboard tape catalog 132. Additionally, the secondary host mainframe 130 includes an operator console 134 communicably attached thereto.

A virtual tape system 136 which has Secure Agent® software 138 executing thereon includes remote configuration software 140. The remote configuration software 140 permits communication with a network 148, such as the Internet, in order to communicate with other elements of the system.

An adaptor card 142 communicates with the secondary host mainframe 130. The VTS 136 also includes a hard drive or multiple hard drives with a memory or multiple memories 144.

A virtual tape system (VTS) catalog 160 is an independent repository of tape related information maintained on a secure name server that is used by the VTS 103 to manage disposition of its tapes and is similar to the mainframe host tape catalog 110. Information from the mainframe tape catalog 110 is periodically provided to the VTS 103 so that it might update the VTS catalog 160. Each time a tape image is moved to archive, that information is placed in the VTS catalog 160.

The VTS catalog 160 may be connected to the VTS through a network, such as the Internet 148. The present invention also includes a software component 150 that is installed and executes upon, or inboard, the mainframe host computer 101. This inboard component 150 transmits information to the virtual tape system catalog 160 accomplished by allocating one of the VTS's emulated devices and communicating through it in order to transfer such things as the scratch list and vault list, each of which are retrieved from the mainframe's tape catalog.

Additionally, tape mount messages that indicate the tape volume serial number to be mounted upon a particular drive are also transferred through this interface. The interface may be accomplished through either of two means. First, it may be implemented by way of unique commands to a VTS emulated tape drive 103 otherwise unused during the normal course of tape operations. When these unique commands are received, they are inspected for validity and the contents retrieved. Second, it may be implemented by way of normal transfer of data to another emulated device type such as a 3286 printer or a 3270 display. These latter approaches require that the normal device data streams be parsed as necessary in order to extract the desired information from them.

The receipt of a tape scratch list causes the VTS catalog 160 to be updated to reflect which tapes are now considered scratch candidates while the receipt of a vault list causes the VTS catalog 160 to be updated to reflect which tapes are to be transmitted to an off-site data storage component.

A remote security administrator central processing unit 151 interactively communicates and connects with other elements of the system through a network, such as the Internet 148. In particular, the remote security administrator 151 communicates with the Secure Agent software 106 operating within the VTS 103. The remote security administrator 151 administers and maintains users/resource profiles and further communicates with information conveyed to the Secure Agent software 106 via software processes associated with the remote configuration software 109. The remote security administrator 151 controls the configuration of one or more VTS devices and also controls access to remote off-site backup devices to be described.

The present invention also includes multiple remote data storage client devices.

The invention will have the ability to utilize RAID technology for disk storage.

RAID is short for Redundant Array of Independent (or Inexpensive) Disks, a category of disk drives that employ two or more drives in combination for fault tolerance and performance. RAID disk drives are used frequently on servers.

There are number of different RAID levels:

Level 0—Striped Disk Array without Fault Tolerance: Provides data striping (spreading out blocks of each file across multiple disk drives) but no redundancy.

This improves performance but does not deliver fault tolerance. If one drive fails then all data in the array is lost.

Level 1—Mirroring and Duplexing: Provides disk mirroring. Level 1 provides twice the read transaction rate of single disks and the same write transaction rate as single disks.

Level 2—Error-Correcting Coding: Not a typical implementation and rarely used, Level 2 stripes data at the bit level rather than the block level.

Level 3—Bit-Interleaved Parity: Provides byte-level striping with a dedicated parity disk. Level 3, which cannot service simultaneous multiple requests, also is rarely used.

Level 4—Dedicated Parity Drive: A commonly used implementation of RAID, Level 4 provides block-level striping (like Level 0) with a parity disk. If a data disk fails, the parity data is used to create a replacement disk. A disadvantage to Level 4 is that the parity disk can create write bottlenecks.

Level 5—Block Interleaved Distributed Parity: Provides data striping at the byte level and also stripe error correction information. This results in excellent performance and good fault tolerance. Level 5 is one of the most popular implementations of RAID.

Level 6—Independent Data Disks with Double Parity: Provides block-level striping with parity data distributed across all disks.

Level 7: A trademark of Storage Computer Corporation that adds caching to Levels 3 or 4.

Level 0+1—A Mirror of Stripes: Not one of the original RAID levels, two RAID 0 stripes are created, and a RAID 1 mirror is created over them. Used for both replicating and sharing data among disks.

Level 10—A Stripe of Mirrors: Not one of the original RAID levels, multiple RAID 1 mirrors are created, and a RAID 0 stripe is created over these.

In the present embodiment, a series of mirrored pairs of remote data storage device servers 170, 172, 174 and 176 are employed. Each remote storage device server has one or more storage devices as shown in FIG. 1. Each remote storage device server of a pair stores the same data as its counterpart so that they mirror one another.

For example, remote storage device server 170 includes disks or mount points 180 and 182. Remote device server 172 includes disks or mount points 184 and 186. Remote device server 174 includes disks or mount points 188 and 190. Remote device server 176 includes disks or mount points 192 and 194.

In the present embodiment, remote storage device server 170 and remote storage device server 172 are arranged in a pair 156. Likewise, remote device server 174 and remote device server 176 are arranged in a pair 158.

Each remote storage device server 170, 172, 174 and 176 utilizes one or more storage mount points for file requests, dynamically spreading the workload across those mount point. The workload is distributed based on the existing load on each storage device server. Factors which are considered include the number of files already opened on each, whether a file being opened already exists on any of the remote storage client devices, and the available space on them.

By way of example but not by way of limitation, if a storage request is made, data will be directed through the virtual tape system 103 to one of the disks or mount points 180 and 182. The same data will also be directed to one of the disks or mount points 184 or 186 in the remote storage device server 172.

Just as balancing is performed by the servers when selecting between mount points and when selecting the preferred read source between a mirrored pair, the virtual tape system 103 equivalently consider all of the various remote storage servers available when selecting a target location for a file to be opened. Factors considered are the number of files opened on each remote storage server, whether the desired file already exists on any of the remote storage servers, and how much free space each remote storage server has available. Prior to the selection, consideration is made as to whether the file is being opened as a new file meaning that any existing instances of the file become deleted, allowing for the new instance of the file to relocate to another server having better resources. If a particular file is found to be located on only one of two servers of a mirrored pair, then the client will access the data from that single server. For example, if the VTS requests a file, it will access the file from the storage server having the file available.

In the event a mirrored server fails then when it again becomes available it may contain file data inconsistent with its paired server. In order to reconcile such problems, including accidental deletions, an administrative module (checker) is employed that inspects all files on each pair to detect inconsistencies. When an inconsistency is identified, then another administrative module (mover) is scheduled to duplicate the data from the server housing the complete file image to the server with the incomplete copy. Multiple administration systems work in conjunction with one another during such self-healing processes.

In addition to the unique aspects of this invention, common file access modes are provided when opening a file such as shared or exclusive file access, read-only or read-write access, open existing or truncate. It is also possible, but not recommended during normal use, for a client to override server mount point selection and target a specific mount point. Normal other file access interfaces are provided such as reading from a file, writing to a file, seeking to a position within a file, retrieving the current file position, truncating a file at a given position and closing a file.

Higher level interfaces are also provided such as renaming a file, deleting a file, determining whether a file exists, determining how much available space remains on the mount point on which an opened file is located, determining how much available space remains on any specific mount point, retrieving a list of all of a server's mount points and retrieving a list of all of the file names, dates and sizes on any specific mount point.

Connections between clients, servers, administration systems and administrators are usually established across such topologies as TCP/IP, although any form of networking or other data transfer mechanisms are equally valid.

Whereas, the present invention has been described in relation to the drawings attached hereto, it should be understood that other and further modifications, apart from those shown or suggested herein, may be made within the spirit and scope of this invention.

What is claimed is:

1. A system to facilitate distributed storage with balanced load and multi-mirroring options, which system comprises:
one or more managerial containing configuration information mover software, and checker software, where each managerial system is in communication with one or more clients via a secure connection and where each managerial system provides the clients with the configuration information;
one or more server processor central processing units, where:
each server processor central processing unit is in communication with one or more of the clients, where each of the clients have software to dynamically spread workload across the one or more server processor central processing units based on factors including how many files are already opened, whether files exist, and available space and where each of the clients communicates directly with the server processor central processing units to dynamically spread workload across the one or more server processor central processing units without passing file data through the managerial systems;
each server processor central processing unit comprises one or more mount points for storage and retrieval of file data by one or more of the clients; and
information about the server processor central processing units is included in the configuration information and the clients use the configuration information when storing and retrieving file data on the one or more mount points; and
a remote security administrator central processing unit connected to the managerial system via a secure network and in communication with the one or more server processor central processing units such that the remote security administrator central processing unit is capable of performing tests on the mount points to measure storage input and output performance and where the remote security administrator central processing unit updates the configuration information on the managerial systems pertaining to the server processor central processing units.

2. A system to facilitate distributed storage with balanced load and multi-mirroring options as set forth in claim 1 wherein said mover module software is capable of transferring data between said server processor central processing units.

3. A system to facilitate distributed storage with balanced load and multi-mirroring options as set forth in claim 1 wherein said checker module software periodically scans each of said plurality of server processor central processing units to ensure integrity and consistency of data.

4. A system to facilitate distributed storage with balanced load and multi-mirroring options as set forth in claim 1 wherein each file of said file data that is created or modified by one of said clients is assigned a fresh unique identifier stored both in said file itself and in said at least one managerial system.

5. A system to facilitate distributed storage with balanced load and multi-mirroring options as set forth in claim 1 wherein said one or more clients are connected to said plurality of server processor central processing units across a network or networks and upon an unexpected disconnection, said client reconnects across one or more network paths of said network or networks where upon any disrupted operation becomes resumed.

6. A system to facilitate distributed storage with balanced load and multi-mirroring options as set forth in claim 1 wherein said plurality of server processor central processing units are organized in pairs and wherein each server processor central processing unit pair stores the same data as its counterpart so they mirror one another.

* * * * *